United States Patent
Kuwabara

(10) Patent No.: US 10,731,905 B2
(45) Date of Patent: Aug. 4, 2020

(54) DEFROSTING DETERMINATION DEVICE, DEFROSTING CONTROL DEVICE, AND AIR CONDITIONER

(71) Applicant: Mitsubishi Electric Corporation, Tokyo (JP)

(72) Inventor: Yasushi Kuwabara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 41 days.

(21) Appl. No.: 16/088,251

(22) PCT Filed: Jun. 21, 2016

(86) PCT No.: PCT/JP2016/068328
§ 371 (c)(1),
(2) Date: Sep. 25, 2018

(87) PCT Pub. No.: WO2017/221315
PCT Pub. Date: Dec. 28, 2017

(65) Prior Publication Data
US 2019/0331376 A1    Oct. 31, 2019

(51) Int. Cl.
*F25B 47/02* (2006.01)
*G05B 19/042* (2006.01)
*F25B 49/02* (2006.01)

(52) U.S. Cl.
CPC ............ *F25B 47/02* (2013.01); *F25B 47/025* (2013.01); *F25B 49/025* (2013.01);
(Continued)

(58) Field of Classification Search
CPC .................. F25B 47/02; F25B 49/025; F25B 2313/0315; F25B 2600/021;
(Continued)

(56) References Cited

U.S. PATENT DOCUMENTS 5,689,964 A * 11/1997 Kawakita ............... F25B 47/02
                                                        62/151
9,032,751 B2 * 5/2015 Lacey .................... F25B 47/02
                                                        62/151
(Continued)

FOREIGN PATENT DOCUMENTS

JP    S58-078036 A    5/1983
JP    H11-281213 A    10/1999

OTHER PUBLICATIONS

International Search Report of the International Searching Authority dated Sep. 13, 2016 for the corresponding international application No. PCT/JP2016/068328 (and English translation).

*Primary Examiner* — Crystal J Barnes-Bullock
(74) *Attorney, Agent, or Firm* — Posz Law Group, PLC

(57) ABSTRACT

A defrosting determination device includes: a condition specifying unit that specifies the air conditioning load condition corresponding to a pair of temperature inside the room and temperature outside the building based on condition information; a slope specifying unit that specifies the slope corresponding to the specified air conditioning load condition based on slope information; a frequency acquiring unit that acquires frequency information specifying the operation frequency of the motor; a calculation unit that calculates a threshold value by multiplying the operation frequency by the slope; a power information acquiring unit that acquires power information specifying power output to the motor; a decision unit that decides whether the power is equal to or less than the threshold value; and a determination unit that determines to start defrosting operation in response to the decision unit deciding that the power is equal to or less than the threshold value.

3 Claims, 5 Drawing Sheets

(52) U.S. Cl.
CPC ...... *G05B 19/042* (2013.01); *F25B 2600/021* (2013.01); *F25B 2700/11* (2013.01); *F25B 2700/151* (2013.01); *F25B 2700/2104* (2013.01); *F25B 2700/2106* (2013.01); *F25D 2600/02* (2013.01); *F25D 2700/123* (2013.01); *F25D 2700/14* (2013.01); *G05B 2219/2614* (2013.01); *Y02B 30/741* (2013.01)

(58) Field of Classification Search
CPC .......... F25B 2700/11; F25B 2700/2106; F25D 2600/02; F25D 2700/123; F25D 2700/14; Y02B 30/741
See application file for complete search history.

(56) References Cited

U.S. PATENT DOCUMENTS

| | | | | |
|---|---|---|---|---|
| 9,506,674 B2* | 11/2016 | Morimoto | ............... | F25B 13/00 |
| 10,024,589 B2* | 7/2018 | Taki | ............... | F25B 13/00 |
| 2005/0241324 A1* | 11/2005 | Cho | ............... | F25D 21/006 |
| | | | | 62/150 |
| 2012/0060530 A1* | 3/2012 | Shimoda | ............... | F25B 13/00 |
| | | | | 62/132 |

* cited by examiner

| SLOPE INFORMATION ||
|---|---|
| AIR CONDITIONING LOAD CONDITION | SLOPE k |
| A | 0.5 |
| B | 1 |
| C | 1.2 |
| ⋮ | ⋮ |

DEFROSTING DETERMINATION DEVICE, DEFROSTING CONTROL DEVICE, AND AIR CONDITIONER

CROSS REFERENCE TO RELATED APPLICATION

This application is a U.S. national stage application of PCT/JP2016/068328 filed on Jun. 21, 2016, the contents of which are incorporated herein by reference.

FIELD

The present invention relates to: a defrosting determination device that determines to start defrosting operation for removing frost adhering to an outdoor heat exchanger during the heating operation of an air conditioner; a defrosting control device that controls defrosting operation; and an air conditioner.

BACKGROUND

During the heating operation of an air conditioner, frost adheres to the outdoor heat exchanger, which reduces the heating capacity. Therefore, it is necessary to remove frost from the outdoor heat exchanger. In order to remove frost, defrosting operation is performed for switching the refrigeration cycle in the air conditioner from the heating cycle to the cooling cycle to cause the outdoor heat exchanger to serve as a condenser. Heat exchange in the heating cycle cannot be performed when the defrosting operation is performed, which reduces the heating capacity. In order not to reduce the heating capacity, it is necessary to avoid unnecessary defrosting operation.

One of the conventionally proposed air conditioners performs defrosting operation if the operation frequency of a compressor in the refrigeration cycle is equal to or greater than the first threshold value and the current flowing in the motor driving the compressor is equal to or less than the second threshold value for more than the third threshold period of time (for example, see Patent Literature 1).

CITATION LIST

Patent Literature

Patent Literature 1: Japanese Patent. Application Laid-open No. H11-281213

SUMMARY

Technical Problem

However, since the relationship between the operation frequency of the compressor in the refrigeration cycle and the current flowing through the motor varies depending on the condition of the air around the air conditioner, the above conventional air conditioner cannot appropriately determine the timing of starting the defrosting operation, and eventually cannot perform defrosting at an appropriate timing.

The present invention has been made in view of the above, and an object thereof is to obtain a defrosting determination device capable of appropriately determining the timing of starting the defrosting operation.

Solution to Problem

In order to solve the above-mentioned problems and achieve the object, a defrosting determination device according to the present invention includes: an indoor temperature acquiring unit that acquires indoor temperature information specifying a temperature inside a room to be heated; an outside air temperature acquiring unit that acquires outside air temperature information specifying a temperature outside a building including the room; a condition storage unit that stores condition information specifying an air conditioning load condition corresponding to each of multiple combinations of temperatures inside the room and temperatures outside the building; and a slope storage unit that stores slope information specifying a slope that is based on the assumption that power output to a motor that drives a compressor used for heating an interior of the room is proportional to an operation frequency of the motor, the slope corresponding to each of a plurality of the air conditioning load conditions. The defrosting determination device according to the present invention further includes: a condition specifying unit that specifies, based on the condition information stored in the condition storage unit, an air conditioning load condition corresponding to a pair of temperature inside the room specified by the indoor temperature information acquired by the indoor temperature acquiring unit and temperature outside the building specified by the outside air temperature information acquired by the outside air temperature acquiring unit; a slope specifying unit that specifies a slope corresponding to the air conditioning load condition specified by the condition specifying unit based on the slope information stored in the slope storage unit; and a frequency acquiring unit that acquires frequency information specifying an operation frequency of the motor. The defrosting determination device according to the present invention further includes: a calculation unit that calculates a threshold value by multiplying the operation frequency specified by the frequency information acquired by the frequency acquiring unit by the slope specified by the slope specifying unit; a power information acquiring unit that acquires power information specifying power output to the motor; a decision unit that decides whether the power specified by the power information acquired by the power information acquiring unit is equal to or less than the threshold value calculated by the calculation unit; and a determination unit that determines to start defrosting operation for removing frost adhering to an outdoor heat exchanger of a refrigeration cycle including the compressor and the motor in response to the decision unit deciding that the power specified by the power information is equal to or less than the threshold value.

Advantageous Effects of Invention

The defrosting determination device according to the present invention can achieve the effect of appropriately determining the timing of starting the defrosting operation.

DESCRIPTION OF EMBODIMENTS

Hereinafter, a defrosting determination device, a defrosting control device, and an air conditioner according to an embodiment of the present invention will be described in detail based on the drawings. The present invention is not limited to the embodiment.

Embodiment

Figure 1:
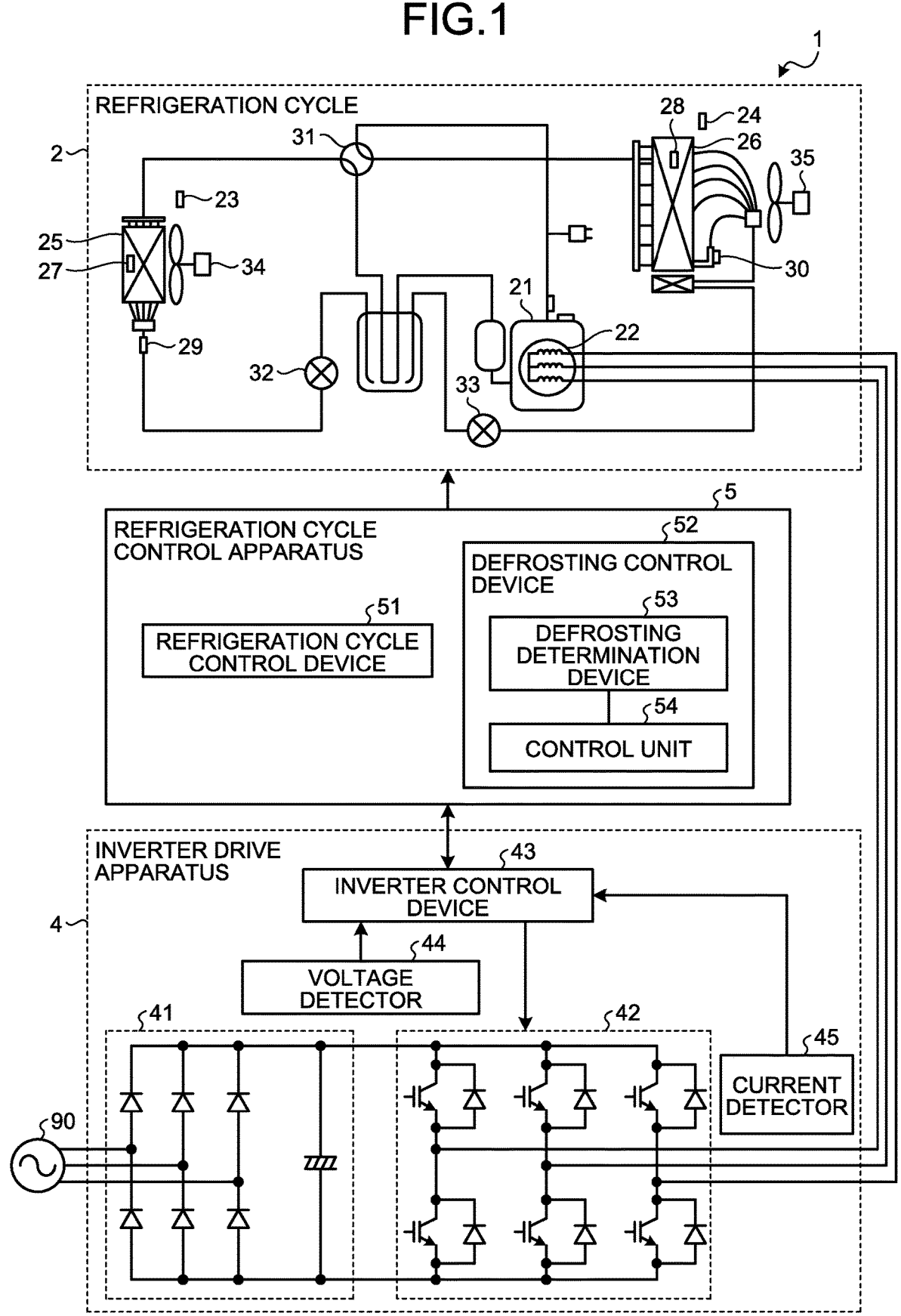
FIG. 1 is a diagram illustrating a configuration of an air conditioner according to an embodiment.

FIG. 1 is a diagram illustrating a configuration of an air conditioner 1 according to an embodiment. The air conditioner 1 includes a refrigeration cycle 2, an inverter drive apparatus 4, and a refrigeration cycle control apparatus 5. The refrigeration cycle 2 includes a compressor 21 for compressing a refrigerant and a motor 22 for driving, the compressor 21. The inverter drive apparatus 4 supplies power to the motor 22 of the refrigeration cycle 2. The refrigeration cycle control apparatus 5 controls the refrigeration cycle 2 and the inverter drive apparatus 4. Also illustrated in FIG. 1 is an AC power source 90 for supplying power to the inverter drive apparatus 4.

The refrigeration cycle 2 includes, in addition to the compressor 21 and the motor 22 mentioned above, an indoor temperature detector 23, an outside air temperature detector 24, an indoor heat exchanger 25, and an outdoor heat exchanger 26. The indoor temperature detector 23 detects the temperature inside the room to be heated. The outside air temperature detector 24 detects the temperature outside the building including the room. The indoor heat exchanger 25 is disposed inside the room. The outdoor heat exchanger 26 is disposed outside the building. The temperature outside the building is the temperature outside the building, for example, at a distance away from the outdoor heat exchanger 26 by any distance ranging from 10 cm to 50 cm.

The refrigeration cycle 2 further includes an indoor heat exchanger temperature detector 27, an outdoor heat exchanger temperature detector 28, an indoor pipe temperature detector 29, an outdoor pipe temperature detector 30, a four-way valve 31, a first electronic expansion valve 32, a second electronic expansion valve 33, an indoor blower 34, and an outdoor blower 35. The indoor heat exchanger temperature detector 27 detects the temperature of the indoor heat exchanger 25. The outdoor heat exchanger temperature detector 28 detects the temperature of the outdoor heat exchanger 26. The indoor blower 34 is disposed inside the room. The outdoor blower 35 is disposed outside the building. Each of the above-mentioned plurality of components of the refrigeration cycle 2 is also included in a conventional refrigeration cycle.

The inverter drive apparatus 4 includes a rectifier 41, an inverter element 42, and an inverter control device 43. The rectifier 41 converts an AC voltage applied from the AC power source 90 into a DC bus voltage. The inverter element 42 converts a DC bus voltage obtained by the rectifier 41 into an AC voltage of any frequency. The inverter control device 43 drives the inverter element 42. The inverter element 42 applies the converted AC voltage to the motor 22 of the refrigeration cycle 2. That is, the inverter element 42 outputs power to the motor 22 of the refrigeration cycle 2.

The inverter drive apparatus 4 further includes a voltage detector 44 and a current detector 45. The voltage detector 44 detects a DC bus voltage obtained by the rectifier 41. The current detector 45 detects an AC current flowing from the inverter element 42 to the motor 22. The inverter control device 43 has the function of calculating the power output from the inverter element 42 to the motor 22 based on the voltage value detected by the voltage detector 44 and the current value detected by the current detector 45.

The refrigeration cycle control apparatus 5 includes a refrigeration cycle control device 51. The refrigeration cycle control device 51 controls turning on and off the refrigeration cycle 2 and the inverter drive apparatus 4 on the basis of an instruction from a device that is not illustrated in FIG. 1, and causes the refrigeration cycle 2 and the inverter drive apparatus 4 to perform any of cooling, heating, and dehumidification operations. The above-mentioned device that is not illustrated in FIG. 1 is a device for use by a user of the air conditioner 1, such as a device that remotely controls the air conditioner 1.

The above-mentioned instruction from the device that is not illustrated in FIG. 1 may include a detailed instruction for cooling or heating operation. The above-mentioned instruction further includes an indication of air conditioning set temperature if it includes a detailed instruction for cooling or heating operation. On the basis of the above-mentioned instruction and the temperatures detected by the respective temperature detectors, the refrigeration cycle control device 51 controls the four-way valve 31, the first electronic expansion valve 32, the second electronic expansion valve 33, the indoor blower 34, and the outdoor blower 35.

The refrigeration cycle control device 51 outputs, to the inverter control device 43 of the inverter drive apparatus 4, an instruction that specifies the rotation speed of the motor 22 in the refrigeration cycle 2. That is, the refrigeration cycle control device 51 controls the motor 22 via the inverter drive apparatus 4. The rotation speed of the motor 22 is the operation frequency of the motor 22. The inverter control device 43 controls the inverter element 42 so that the motor 22 rotates at the operation frequency specified by the above instruction from the refrigeration cycle control device 51. The inverter control device 43 outputs information specifying the operation frequency of the motor 22 to the refrigeration cycle control device 51.

The refrigeration cycle control apparatus 5 further includes a defrosting control device 52 that controls defrosting operation for removing frost adhering to the outdoor heat exchanger 26 of the refrigeration cycle 2. The defrosting control device 52 includes a defrosting determination device 53 and a control unit 54. The defrosting determination device 53 determines to start the defrosting operation. The control unit 54 starts the defrosting operation in response to the defrosting determination device 53 determining to start the defrosting operation.

Figure 2:
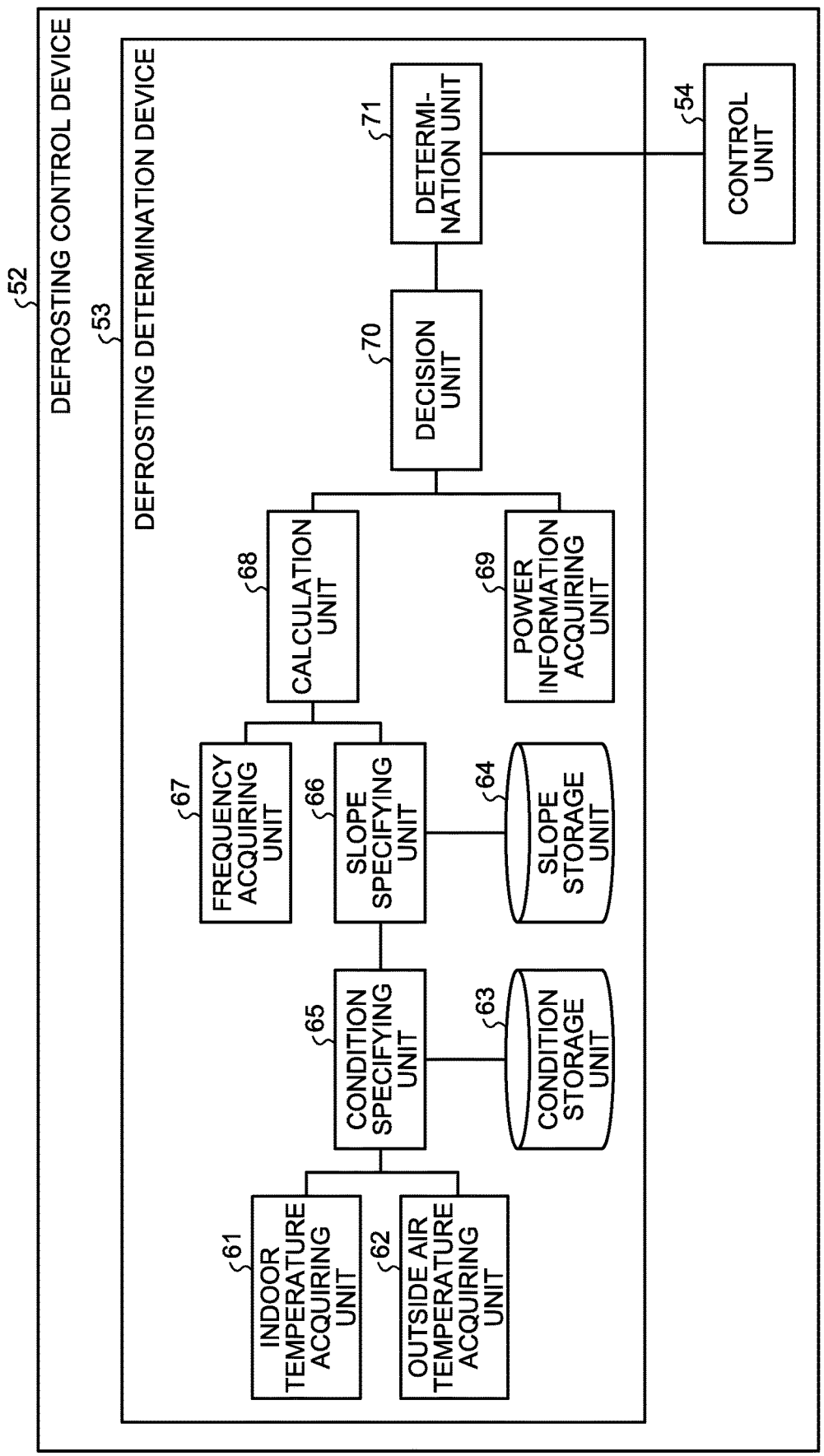
FIG. 2 is a diagram illustrating a configuration of a defrosting control device in the air conditioner according to the embodiment.

FIG. 2 is a diagram illustrating a configuration of the defrosting control device 52 in the air conditioner 1 according to the embodiment. The defrosting control device 52 includes the defrosting determination device 53 and the control unit 54 as described above. The defrosting determination device 53 includes an indoor temperature acquiring unit 61 and an outside air temperature acquiring unit 62. The indoor temperature acquiring unit 61 acquires, from the indoor temperature detector 23 of the refrigeration cycle 2, indoor temperature information specifying the temperature inside the room to be heated. The outside air temperature acquiring unit 62 acquires, from the outside air temperature detector 24 of the refrigeration cycle 2, outside air temperature information specifying the temperature outside the building including the room.

Figures 3, 4:
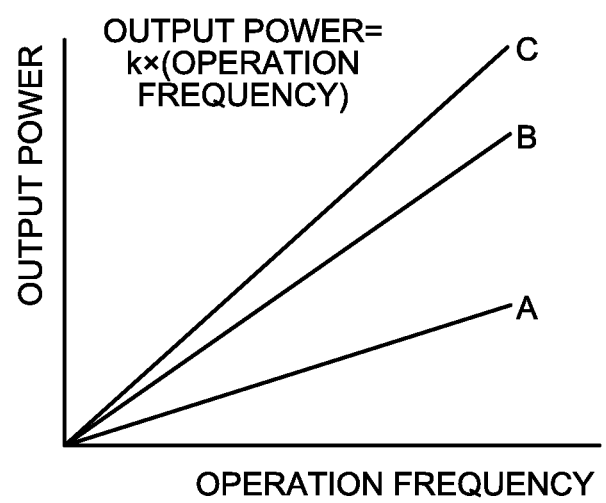
FIG. 3 is a diagram illustrating an example of condition information stored in a condition storage unit of a defrosting determination device according to the embodiment.
FIG. 4 is a schematic diagram indicating that, in the air conditioner according to the embodiment, slopes that are based, on the assumption that the power output to a motor when the efficiency of a refrigeration cycle does not decrease even b frost formation on an outdoor heat exchanger of the refrigeration cycle is proportional to the operation frequency of the motor differ depending on the air conditioning load condition.

The defrosting determination device 53 further includes a condition storage unit 63 that stores condition information specifying an air conditioning load condition corresponding to each of multiple combinations of temperatures inside the room and temperatures outside the building. FIG. 3 is a diagram illustrating an example of condition information stored in the condition storage unit 63 of the defrosting determination device 53 according to the embodiment. In FIG. 3, the temperature inside the room is described as "indoor temperature", and the temperature outside the building is described as "outside air temperature". FIG. 3 illustrates, among condition information stored in the condition storage unit 63, air conditioning load conditions A, B, and C corresponding to the three combinations specified by a specific temperature inside the room and three different temperatures outside the building.

The defrosting determination device 53 further includes a slope storage unit 64 that stores slope information specifying the slope k corresponding to each of the plurality of air conditioning load conditions. The slope k is based on the assumption that the power output to the motor 22 that drives the compressor 21 used for heating the interior of the room when the efficiency of the refrigeration cycle 2 does not decrease even by frost formation on the outdoor heat exchanger 26 of the refrigeration cycle 2 is proportional to the operation frequency of the motor 22. Each of the plurality of slopes k is determined experimentally, for example.

FIG. 4 is a schematic diagram indicating that, in the air conditioner 1 according to the embodiment, slopes k that are based on the assumption that the power output to the motor 22 when the efficiency of the refrigeration cycle 2 does not decrease even by frost formation on the outdoor heat exchanger 26 of the refrigeration cycle 2 is proportional to the operation frequency of the motor 22 differ depending on the air conditioning load condition "A" in FIG. 4 means air conditioning load condition A in FIG. 3, "B" in FIG. 4 means air conditioning load condition B in FIG. 3, and "C" in FIG. 4 means air conditioning load condition C in FIG. 3.

Figures 5, 6:
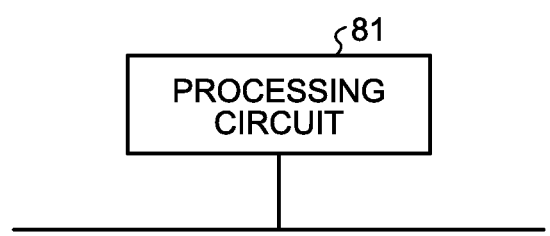
FIG. 5 is a diagram illustrating an example of slope information stored in a slope storage unit of the defrosting determination device according to the embodiment.
FIG. 6 is a diagram in that at least some of the components constituting the defrosting determination device according to the embodiment are a processing circuit.

FIG. 5 is a diagram illustrating an example of slope information stored in the slope storage unit 64 of the defrosting determination device 53 in the defrosting control device 52 according to the embodiment. In the example of FIG. 5, the slope k corresponding to air conditioning load condition A in FIG. 3 is "0.5", the slope k corresponding to air conditioning load condition B in FIG. 3 is "1", and the slope k corresponding air conditioning load condition C in FIG. 3 is "1.2".

The defrosting determination device 53 further includes a condition specifying unit 65 that specifies, based on the condition information stored in the condition storage unit 63, the air conditioning load condition corresponding to a pair of temperature inside the room specified by the indoor temperature information acquired by the indoor temperature acquiring unit 61 and temperature outside the building specified by the outside air temperature information acquired by the outside air temperature acquiring unit 62. For example, the condition specifying unit 65 specifies, from among air conditioning load conditions A, B, and C in the condition information of FIG. 3, the air conditioning load condition corresponding to the pair specified by information acquired by the indoor temperature acquiring unit 61 and the outside air temperature acquiring unit 62.

The defrosting determination device 53 further includes a slope specifying unit 66 that specifies the slope k corresponding to the air conditioning load condition specified by the condition specifying unit 65 based on the slope information stored in the slope storage unit 64. For example, when the air conditioning load condition specified by the condition specifying unit 65 is air conditioning load condition C, the slope specifying unit 66 specifies the slope k corresponding to air conditioning load condition C from the slope information in FIG. 5 as "1.2".

The defrosting determination device 53 further includes a frequency acquiring unit 67 that acquires frequency information that is transmitted from the inverter control device 43 to the refrigeration cycle control device 51 and specifies the operation frequency of the motor 22 of the refrigeration cycle 2. As described above, the inverter control device 43 controls the inverter element 42 so that the motor 22 rotates at the operation frequency specified by the instruction from the refrigeration cycle control device 51. That is, the inverter control device 43 controls the AC voltage output to the motor 22 based on the instruction from the refrigeration cycle control device 51. The frequency acquiring unit 67 may acquire frequency information specifying the operation frequency of the motor 22 from the refrigeration cycle control device 51.

The defrosting determination device 53 further includes a calculation unit 68 that calculates a threshold value by multiplying the operation frequency specified by the frequency information acquired by the frequency acquiring unit 67 by the slope k specified by the slope specifying unit 66.

The defrosting determination device 53 further includes a power information acquiring unit 69 that acquires, from the inverter control device 43, power information specifying the power output to the motor 22 of the refrigeration cycle 2. As described above, the inverter control device 43 has the function of calculating the power output from the inverter element 42 to the motor 22 based on the voltage value detected by the voltage detector 44 and the current value detected by the current detector 45. The power information acquiring unit 69 acquires, from the inverter control device 43, power information specifying the power calculated by the inverter control device 43.

The defrosting determination device 53 further includes a decision unit 70 and a determination unit 71. The decision unit 70 decides whether the power specified by the power information acquired by the power information acquiring unit 69 is equal to or less than the threshold value calculated by the calculation unit 68. The determination unit 71 determines to start the defrosting operation for removing frost adhering to the outdoor heat exchanger 26 of the refrigeration cycle 2 in response to the decision unit 70 deciding that the power specified by the power information is equal to or less than the threshold value.

In response to the determination unit 71 of the defrosting determination device 53 determining to start the defrosting operation for removing frost adhering to the outdoor heat exchanger 26 of the refrigeration cycle 2, the control unit 54 starts the defrosting operation. During the heating operation of the air conditioner 1, the outdoor heat exchanger 26 serves as an evaporator, so that the temperature of the outdoor heat exchanger 26 becomes 0° C. or less, moisture in the air coagulates, and frost adheres to the outdoor heat exchanger 26. In the defrosting operation, the refrigeration cycle 2 is changed from the heating operation to the cooling operation, and a gas refrigerant with a temperature higher than 0° C. discharged from the compressor 21 flows into the outdoor heat exchanger 26, and frost adhering to the outdoor heat exchanger 26 is melted. That is, in response to the determination unit 71 determining to start the defrosting operation, the control unit 54 causes the refrigeration cycle 2 to perform the cooling operation.

Note that the functions of the plurality of components including the indoor temperature acquiring unit 61, the outside air temperature acquiring unit 62, the condition specifying unit 65, the slope specifying unit 66, the frequency acquiring unit 67, the calculation unit 68, the power information acquiring unit 69, the decision unit 70, and the determination unit 71 constituting the defrosting determination device 53 according to the embodiment may be realized by a processing circuit 81 in part or in whole. FIG. 6 is a diagram indicating that at least some of the components constituting the defrosting determination device 53 according to the embodiment are the processing circuit 81.

The processing circuit 81 is dedicated hardware. Specifically, the processing circuit 81 is a single circuit, a composite circuit, a programmed processor, a parallel programmed processor, an application specific integrated circuit (ASIC), a field-programmable gate array (FPGA), or a combination thereof. Some of the plurality of components constituting the defrosting determination device 53 may be dedicated hardware separate from the remaining part.

Figure 7:
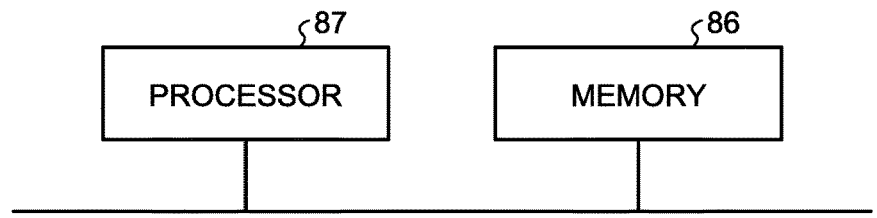
FIG. 7 is a diagram indicating that at least some of the components constituting the defrosting determination device according to the embodiment are a processor.

The plurality of components including the indoor temperature acquiring unit 61, the outside air temperature acquiring unit 62, the condition specifying unit 65, the slope specifying unit. 66, the frequency acquiring unit 67, the calculation unit 68, the power information acquiring unit 69, the decision unit 70, and the determination unit 71 constituting the defrosting determination device 53 may be in part or in whole a processor 87 that executes a program stored in a memory 86. FIG. 7 is a diagram indicating that at least some of the components constituting the defrosting determination device 53 according to the embodiment are the processor 87. The processor 87 is a central processing unit (CPU), a processing apparatus, a computing apparatus, a microprocessor, a microcomputer, or a digital signal processor (DSP).

When at least some of the components constituting the defrosting determination device 53 are the processor 87, the functions of at least some of the components constituting the defrosting determination device 53 are realized by the processor 87 and software, firmware, or a combination of software and firmware. Software or firmware is described as a program and stored in the memory 86. By reading and executing a program stored in the memory 86, the processor 87 realizes the functions of some of the components constituting the defrosting determination device 53.

In other words, when some of the components constituting the defrosting determination device 53 are the processor 87, the defrosting determination device 53 includes the memory 86 for storing a program from which steps to be executed by some of the components constituting the defrosting determination device 53 are executed as a result. It can be said that a program stored in the memory 86 causes the computer to execute the procedure or method executed by some of the components constituting the defrosting determination device 53.

Examples of the memory 86 include a non-volatile or volatile semiconductor memory, a magnetic disk, a flexible disk, an optical disc, a compact disc, a mini disc, a digital versatile disk (DVD), and the like. Examples of the non-volatile or volatile semiconductor memory include a random access memory (RAM), a read only memory (ROM), a flash memory, an erasable programmable read only memory (EPROM), an electrically erasable programmable read-only memory (EEPROM), and the like.

Some of the functions of the plurality of components constituting the defrosting determination device 53 may be realized by dedicated hardware, and the remaining part may be realized by software or firmware. As described above, the functions of the plurality of components constituting the defrosting determination device 53 can be realized by hardware, software, firmware, or a combination thereof.

The control unit 54 may be the processing circuit 81 or the processor 87 as in the case of the plurality of components constituting the defrosting determination device 53. Alternatively, the control unit 54 may be a processing circuit equivalent to the processing circuit 81, or may be a processor equivalent to the processor 87. The inverter control device 43 and the refrigeration cycle control device 51 may be in part or in whole the processing circuit 81 or the processor 87, a processing circuit equivalent to the processing circuit 81, or a processor equivalent to the processor 87.

Figure 8:
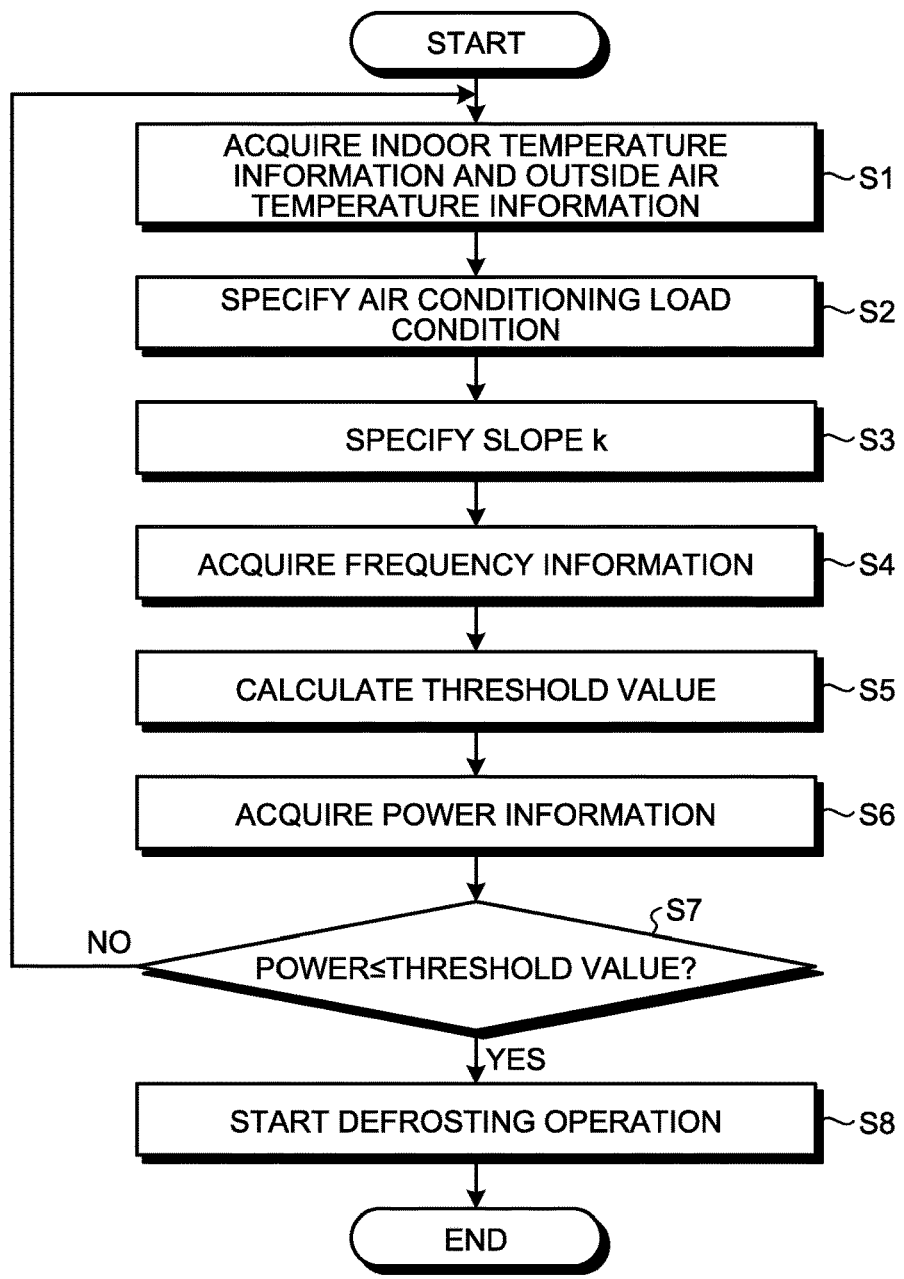
FIG. 8 is a flowchart illustrating an exemplary procedure for the operation of the defrosting control device according to the embodiment.

Next, the operation of the defrosting control device 52 will be described. FIG. 8 is a flowchart illustrating an exemplary procedure for the operation of the defrosting control device 52 according to the embodiment. The following description is based on the assumption that the refrigeration cycle 2 is performing heating operation. The indoor temperature acquiring unit 61 acquires, from the indoor temperature detector 23 of the refrigeration cycle 2, indoor temperature information specifying the temperature inside the room to be heated, and the outside air temperature acquiring unit 62 acquires, from the outside air temperature detector 24 of the refrigeration cycle 2, outside air temperature information specifying the temperature outside the building including the room (S1).

The condition specifying unit 65 specifies, based on the condition information stored in the condition storage unit 63, the air conditioning load condition corresponding to a pair of temperature inside the room specified by the indoor temperature information acquired by the indoor temperature acquiring unit 61 and temperature outside the building specified by the outside air temperature information acquired by the outside air temperature acquiring unit 62 (S2).

The slope specifying unit 66 specifies the slope k corresponding to the air conditioning load condition specified by the condition specifying unit 65 based on the slope information stored in the slope storage unit 64 (S3). The frequency acquiring unit 67 acquires frequency information that is transmitted from the inverter control device 43 to the refrigeration cycle control device 51 and specifies the operation frequency of the motor 22 of the refrigeration cycle 2 (S4).

The calculation unit 68 calculates a threshold value by multiplying the operation frequency specified by the frequency information acquired by the frequency acquiring unit 67 by the slope k specified by the slope specifying unit 66 (S5). The power information acquiring unit 69 acquires, from the inverter control device 43, power information specifying the power output to the motor 22 of the refrigeration cycle 2 (S6).

The decision unit 70 decides whether the power specified by the power information acquired by the power information acquiring unit 69 is equal to or less than the threshold value calculated by the calculation unit 68 (S7). In response to the decision unit 70 deciding that the power specified by the power information is greater than the threshold value (No in S7), the operation of the defrosting control device 52 proceeds to step S1. In response to the decision unit 70 deciding that the power specified by the power information is equal to or less than the threshold value (Yes in S7), the determination unit 71 determines to start the defrosting operation for removing frost adhering to the outdoor heat exchanger 26 of the refrigeration cycle 2, and the control unit 54 starts the defrosting operation (S8).

As described above, the defrosting determination device 53 specifies the air conditioning load condition corresponding to a pair of temperature inside the room and temperature outside the building based on the condition information stored in the condition storage unit 63, and specifies the slope k corresponding to the specified air conditioning load condition based on the slope information stored in the slope storage unit 64. The defrosting determination device 53 acquires frequency information specifying the operation frequency of the motor 22 of the refrigeration cycle 2, and calculates a threshold value by multiplying the operation frequency specified by the acquired frequency information by the specified slope k. The defrosting determination device 53 acquires power information specifying the power output to the motor 22, decides whether the power specified by the power information is equal to or less than the threshold value, and determines to start the defrosting operation in response to deciding that the power specified by the power information is equal to or less than the threshold value.

In a case where frost adheres to the outdoor heat exchanger 26 of the refrigeration cycle 2, the ability of heat exchange in the outdoor heat exchanger 26 decreases, so that the rate of increase in the pressure of the refrigerant in the refrigeration cycle 2 is low as compared with a case where no frost adheres to the outdoor heat exchanger 26. Therefore, the workload of the compressor 21 of the refrigeration cycle 2 does not increase, and as a result, the power output to the motor 22 of the refrigeration cycle 2 is smaller than the power output to the motor 22 when no frost adheres to the outdoor heat exchanger 26.

In the above embodiment, focusing on the fact that the power output to the motor 22 when frost adheres to the outdoor heat exchanger 26 is smaller than the power output to the motor 22 when no frost adheres to the outdoor heat exchanger 26, the defrosting determination device 53 determines to start the defrosting operation based on the operation frequency of the motor 22 and the power output to the motor 22. Therefore, the defrosting determination device 53 can appropriately determine the timing of starting the defrosting operation. That is, the defrosting determination device 53 can determine the timing of starting the defrosting operation with higher accuracy than before. As a result, the air conditioner 1 can perform defrosting at an appropriate timing during the heating operation.

As described with reference to FIGS. 6 and 7, at least some of the components constituting the defrosting determination device 53 may be the processing circuit 81 or the processor 87. In that case, since the defrosting determination device 53 can be configured without using large-scale hardware, the defrosting determination device 53 can be prevented from increasing in size, and the cost for the defrosting determination device 53 can be reduced.

The configuration described in the above-mentioned embodiment indicates an example of the contents of the present invention. The configuration can be combined with another well-known technique, and a part of the configuration can be omitted or changed in a range not departing from the gist of the present invention.

REFERENCE SIGNS LIST 1 air conditioner; 2 refrigeration cycle; 4 inverter drive apparatus; 5 refrigeration cycle control apparatus; 21 compressor; 22 motor; 23 indoor temperature detector; 24 outside air temperature detector; indoor heat exchanger; 26 outdoor heat exchanger; 27 indoor heat exchanger temperature detector; 28 outdoor heat exchanger temperature detector; 29 indoor pipe temperature detector; 30 outdoor pipe temperature detector; 31 four-way valve; 32 first electronic expansion valve; 33 second electronic expansion valve; 34 indoor blower; 35 outdoor blower; 41 rectifier; 42 inverter element; 43 inverter control device; 44 voltage detector; 45 current detector; 51 refrigeration cycle control device; 52 defrosting control device; 53 defrosting determination device; 54 control unit; 61 indoor temperature acquiring unit; 62 outside air temperature acquiring unit; 63 condition storage unit; 64 slope storage unit; 65 condition specifying unit; 66 slope specifying unit; 67 frequency acquiring unit; 68 calculation unit; 69 power information acquiring unit; 70 decision unit; 71 determination unit; 81 processing circuit; 86 memory; 87 processor; 90 AC power source.

The invention claimed is:

1. A defrosting determination device comprising:
an indoor temperature acquirer to acquire indoor temperature information specifying a temperature inside a room to be heated;
an outside air temperature acquirer to acquire outside air temperature information specifying a temperature outside a building including the room;
a condition memory to store condition information specifying an air conditioning load condition corresponding to each of multiple combinations of temperatures inside the room and temperatures outside the building;
a slope memory to store slope information specifying a slope that is based on the assumption that power output to a motor that drives a compressor used for heating an interior of the room is proportional to an operation frequency of the motor, the slope corresponding to each of a plurality of the air conditioning load conditions;
a condition specifier to specify, based on the condition information stored in the condition memory, an air conditioning load condition corresponding to a pair of temperature inside the room specified by the indoor temperature information acquired by the indoor temperature acquirer and temperature outside the building specified by the outside air temperature information acquired by the outside air temperature acquirer;
a slope specifier to specify a slope corresponding to the air conditioning load condition specified by the condition specifier based on the slope information stored in the slope memory;
a frequency acquirer to acquire frequency information specifying an operation frequency of the motor;
a calculator to calculate a threshold value by multiplying the operation frequency specified by the frequency information acquired by the frequency acquirer by the slope specified by the slope specifier;

a power information acquirer to acquire power information specifying power output to the motor;

a decider to decide whether the power specified by the power information acquired by the power information acquirer is equal to or less than the threshold value calculated by the calculator; and a determinator to determine to start defrosting operation for removing frost adhering to an outdoor heat exchanger of a refrigeration cycle including the compressor and the motor in response to the decider deciding that the power specified by the power information is equal to or less than the threshold value.

2. A defrosting control device comprising:

the defrosting determination device according to claim 1; and a controller to start the defrosting operation in response to the determinator determining to start the defrosting operation.

3. An air conditioner comprising:

the defrosting control device according to claim 2; and the refrigeration cycle.

\* \* \* \* \*